United States Patent [19]
Andersson

[11] Patent Number: 5,350,335
[45] Date of Patent: Sep. 27, 1994

[54] DISTRIBUTOR DEVICE FOR A VENTILATION SYSTEM IN A VEHICLE

[75] Inventor: Roland Andersson, Sollebrunn, Sweden

[73] Assignee: Saab Automobile Aktiebolag, Sweden

[21] Appl. No.: 30,116

[22] PCT Filed: Sep. 17, 1991

[86] PCT No.: PCT/SE91/00620
§ 371 Date: Mar. 15, 1993
§ 102(e) Date: Mar. 15, 1993

[87] PCT Pub. No.: WO92/05043
PCT Pub. Date: Apr. 2, 1992

[30] Foreign Application Priority Data
Sep. 17, 1990 [SE] Sweden ............... 9002950-5

[51] Int. Cl.5 .................................. B60H 1/26
[52] U.S. Cl. .................................. 454/121
[58] Field of Search ............... 454/121, 124, 126, 159, 454/160, 161

[56] References Cited

U.S. PATENT DOCUMENTS

| | | |
|---|---|---|
| 3,659,515 | 5/1972 | Galaniuk . |
| 3,661,069 | 5/1972 | Grosseau ............. 454/160 |
| 4,157,113 | 6/1979 | Karran et al. ......... 165/42 |

FOREIGN PATENT DOCUMENTS

| | | |
|---|---|---|
| 2209365 | 9/1973 | Fed. Rep. of Germany . |
| 3119557 | 3/1982 | Fed. Rep. of Germany ...... 454/121 |

Primary Examiner—Harold Joyce
Attorney, Agent, or Firm—Ostrolenk, Faber, Gerb & Soffen

[57] ABSTRACT

A ventilation system for a vehicle includes a distributor device for distributing ventilation air to different ventilation nozzles in the vehicle. The distributor device is provided with a cylindrical ventilator unit journal in a housing and provided with a casing surface and end walls in which there are disposed apertures for cooperation with outlets disposed in the circumferential surface and walls of the housing, whereby rotation of the ventilator unit makes possible regulation of the air flow to the different outlets.

19 Claims, 4 Drawing Sheets

DISTRIBUTOR DEVICE FOR A VENTILATION SYSTEM IN A VEHICLE

The present invention relates to a distributor device for a ventilation system in a vehicle, intended for distributing ventilation air to a number of different ventilation nozzles in the vehicle, and provided with a substantially cylindrical housing which is designed with a number of outlets and in which a ventilator unit is rotatably journalled for distributing ventilation air to the different outlets in the housing, the housing having outlets in both its circumferential surface and its end walls, and the ventilator unit being cylindrical and having a circumferential surface and end walls in which there are provided apertures which, by rotation of the ventilator unit, may be caused to coincide with corresponding outlets in the circumferential surface and end walls of the housing.

STATE OF THE ART

Ventilation systems for vehicles generally include a ventilation housing in which air is led in and tempered before being supplied, by means of a distributor device, to the interior of the vehicle via a number of outlets, and nozzles placed at different positions in the vehicle interior. Such outlets and nozzles may, for example, consist of defroster nozzles, dashboard nozzles, fascia nozzles and floor nozzles. Distribution of the ventilation air between such outlets is commonly achieved with the aid of a number of dampers which may be caused to close or open communication between the ventilation housing and each respective nozzle. In the employment of, for example, three different nozzles, it is usual in such contexts to employ three different dampers for regulating the nozzles. As a result, such a ventilation system will be of relatively complex design and construction, with a plurality of separate dampers and regulators. Consequently, the design of the distributor device will be bulky in itself in order to be able to accommodate all of the included components. In turn, this implies that the above-mentioned prior art solution is relatively heavy and expensive to manufacture. With a view to reducing the number of regulators and dampers or ventilator devices, it is known in the Art to cause one and the same ventilator device to control distribution of air to a plurality of different outlets.

One such simplified design of the distributor device is disclosed in SE,C,434 487, in which a ventilator device designed as a planar damper is disposed to control the air distribution to three different outlets in the circumferential surface of the housing of the distributor device. One drawback inherent in such a design is, however, that it is necessary to determine beforehand how the air is to be distributed at certain pre-set damper positions. As a result, such a solution does not afford the same possibility of individual regulation of each outlet as when separate dampers are employed.

The disadvantages inherent in both of the above-mentioned solutions become even more manifest when further outlets are desired, for example if it is desired to provide, in a private automobile, separate air outlets in the immediate proximity of the rear seat. If, in addition, the intention is to have the possibility of providing separate regulation of the ventilation air on the right and left hand sides in the vehicle, sophisticated variations of the prior Art solutions will be even more complex and expensive.

A further solution is proposed in DE,A,2209365, in which a cylindrical distributor housing with a cylindrical ventilator drum disposed in the housing distributes air from one inlet in the end wall to outlets in the circumferential surfaces. By rotating the ventilator drum, apertures in the ventilator drum can be caused to coincide with corresponding apertures in the housing, whereby regulation of the air flow between outlets can be achieved. U.S. Pat. No. 3659515 and U.S. Pat. No. 4157113 also call for the utilization of cylindrical ventilation drums in which inlets and outlets are provided in the circumferential surface of the ventilation drum.

A further development of the cylinder concept is disclosed in German Patent Specification DE,C,3421323, in which air is distributed out through a plurality of outlets disposed either in the end walls or the circumferential surfaces. However, this solution entails that large pressure drops occur in the end wall outlets and that the cylinder must be made unnecessarily large in order that the plurality of desired regulation variants can be realized, each one with minimum pressure drop.

OBJECT OF THE INVENTION

The object of the present invention is to obviate the drawbacks inherent in the prior Art solutions and to realize a distributor device which is of simple and compact construction while nevertheless making it possible to achieve individual regulation of many different outlets in a desired sequence, with the least possible pressure drop for the majority of the regulation variants.

This object is attained according to the present invention in that the ventilator unit is provided, in at least one end wall, with an aperture which merges in an aperture located in the circumferential surface, whereby outlets in the housing which communicate with both the wall and circumferential surface may be supplied with air via both the end wall of the housing and its circumferential surface.

By utilizing, according to the present invention, a cylindrical ventilator unit, considerably greater possibilities than hitherto will be created for individually controlling each outlet separately than is the case in the employment of a planar ventilator unit. Since all regulation may be effected simply by rotating the ventilator unit, regulation may readily be carried out manually or using a servo motor. The design with recesses in the ventilator unit which extend over both the circumferential surface and end wall makes for the possibility of creating at least one large outlet in one position of rotation, with slight extent in the circumferential direction. This implies that a plurality of large outlets may be obtained which can be opened and closed sequentially with slight rotation of the ventilator unit, at the same time as the dimensions of the distributor device can be kept to a minimum. Simultaneously, these recesses in the ventilator unit extending over both end wall and circumferential surface can be utilized for apertures in the housing which are placed in a different position of rotation but which only partly overlap the recesses of the ventilator unit. Such apertures can be employed for ventilation outlets where but limited flows are required, and a certain increased pressure drop can be accepted.

The cylindrical ventilator unit operates as a regulation schedule, which implies that the air conditioning system may readily give different air volume distributions in the same outlet by replacing the cylindrical ventilator unit.

According to one preferred embodiment of the present invention, the apertures in the ventilator unit may be of a different configuration than the outlets in the housing. This makes possible regulation with a high degree of accuracy.

According to another preferred embodiment of the present invention, the ventilator unit may be axially divided into at least two ventilator elements each proved with its circumferential portion and end wall portion. These can be maneuvered together or separately. The possibility will hereby be created for a simple independent regulation of the right and left-hand sides in the vehicle.

Further advantages and characterizing features of the present invention will be apparent from the subsequent description and the appended Claims.

BRIEF DESCRIPTION OF THE ACCOMPANYING DRAWINGS

The nature of the present invention and its aspects will be more readily understood from the following brief description of the accompanying Drawings, and discussion of one preferred embodiment with particular reference thereto.

In the accompanying drawings:

FIG. 1 schematically illustrates a ventilation system with associated discharge nozzles for the interior of a vehicle;

Figure 7:
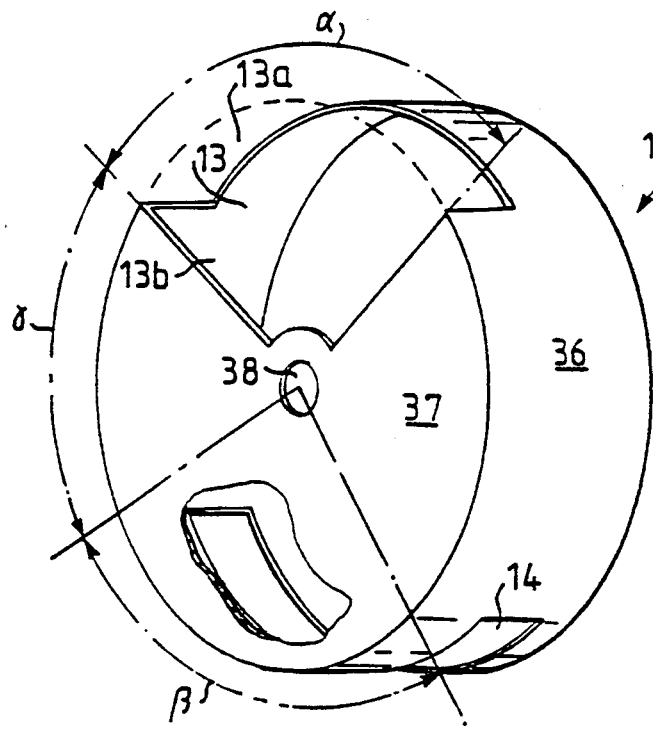
FIG. 7 is a perspective view of a part of the ventilator unit for the distributor device according to the present invention.
Figure 10:
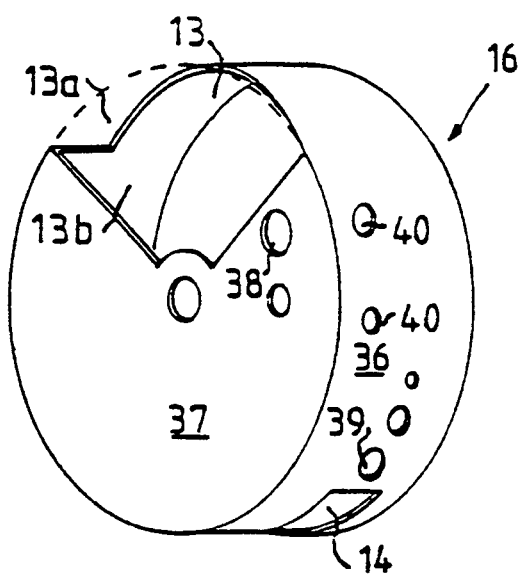

FIGS. 8a-d show the ventilator unit and housing to illustrate how ventilation is modified at different settings for the air regulation;

FIGS. 9a-d show the dial settings corresponding to FIGS. 8a-d, respectively; and FIG. 10 shows one variation of the ventilator unit of FIG. 7.

DESCRIPTION OF ONE EMBODIMENT

Figure 1:
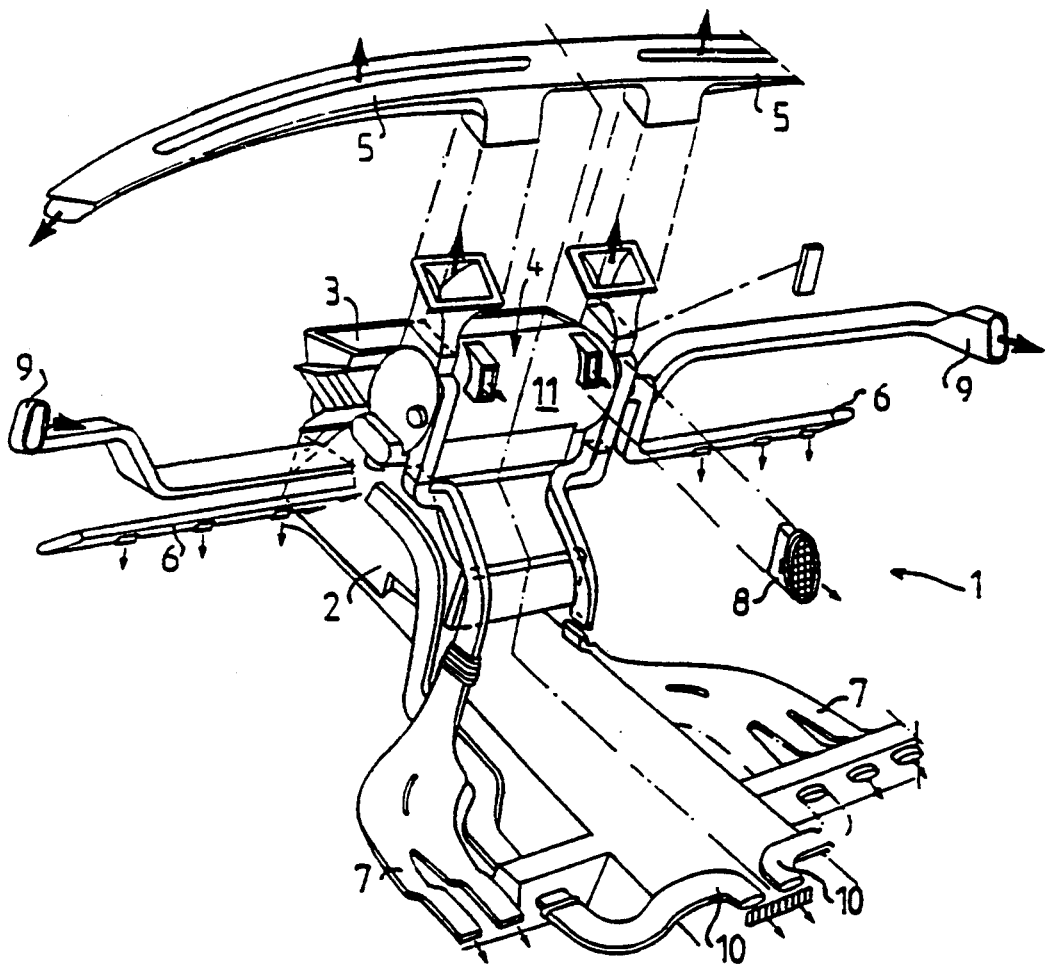

Referring to the Drawings, the design and construction of a ventilation system I intended for a private automobile is schematically illustrated in FIG. 1. In the customary manner, a ventilation housing 2 accommodates a fan and means for adjusting the temperature of the air when necessary. The ventilation housing 2 receives air on the intake side via an air intake 3 and is, on the outlet side, in communication with a distributor device 4 by means of which air is distributed to different discharge nozzles in the vehicle interior in order to realize ventilation suited to the circumstances.

In the illustrated embodiment, defroster nozzles 5 direct air towards the windscreen and the front side windows or quarter lights, while front floor nozzles 6 and rear floor nozzles 7 deliver air to the front and rear floor compartments, respectively. In addition, front ventilation nozzles are provided forwardly in the vehicle interior, in the form of one or more centre nozzles 8 and side nozzles 9 on the dashboard or fascia panel. Further back in the vehicle interior, there are provided rear ventilation nozzles 10 for the rear seat passengers, these nozzles discharging higher up than the rear floor nozzles 7. In this particular case, these different discharge nozzles are symmetrically disposed about the longitudinal centre line of the vehicle, but of course other arrangements and locations are also possible.

Figure 2:
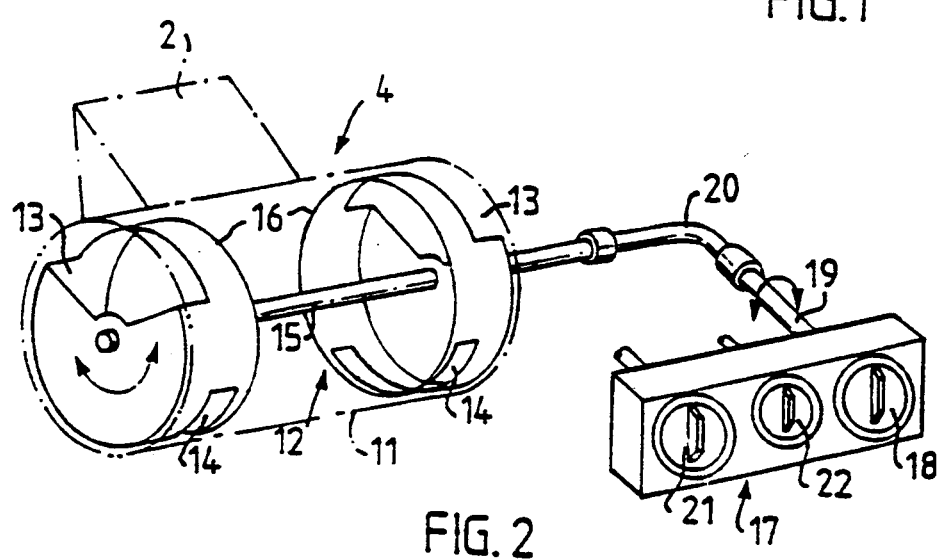
FIG. 2 shows the principle for altering the ventilation in a distributor device according to the present invention.

The distributor device 4 has a substantially circular-cylindrical housing 11 whose longitudinal direction is at right angles to the longitudinal direction of the vehicle. Both the circumferential surface and end walls of this housing 11 are provided with outlets which, via suitable channels, are in communication with different discharge nozzles in accordance with the foregoing (see FIG. 1). As is apparent from FIG. 2, a cylindrical ventilator unit 12 is rotatably journalled within the housing 11, in which unit there are provided apertures 13, 14 which, by rotation of the ventilator unit, may be brought into different positions in relation to the outlets in the circumferential surface and end walls of the housing 11. In this instance, the ventilator unit 12 consists of two axially spaced ventilator elements 16 mounted on a common shaft 15 and each provided with apertures 13, 14 via which air flowing in between the ventilator elements from the ventilation housing 2 may be distributed to the different outlets on the distributor device 4. The ventilator elements may possibly also be interconnected in a manner other than using the shaft 15.

The ventilator unit 12 may be rotated to different adjustment positions with the aid of an air regulator device 18 disposed on a regulator box 17 intended for the ventilation system. The output shaft 19 of the air regulator device 18 is connected via a flexible shaft 20 to the shaft 15 of the ventilator unit 12. The regulator box 17 is also provided with a temperature governor 21 for regulating the temperature of that air which is supplied to the distributor device 4, and a fan regulator 22 for regulating the positive air discharge speed.

Figure 3:
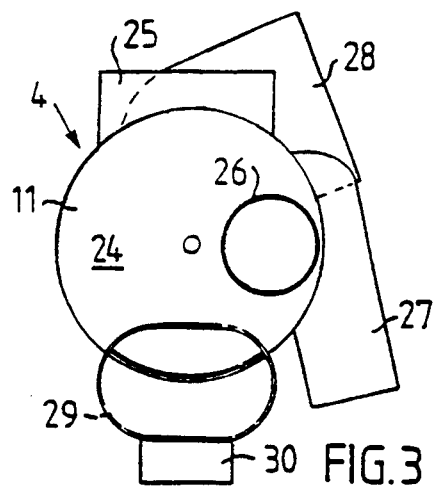
FIG. 3 is an end elevation from the left in FIG. 1 of the distributor device according to the present invention included in the ventilation system.
Figure 4:
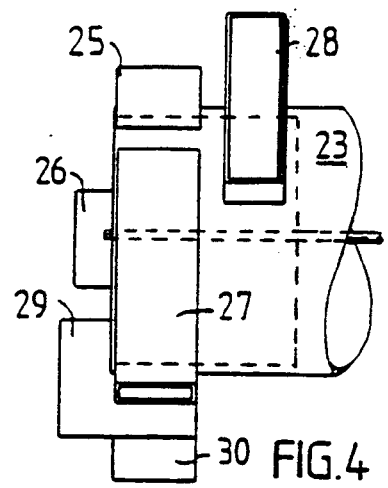
FIG. 4 is a side elevation of the distributor device according to FIG. 3.
Figure 5:
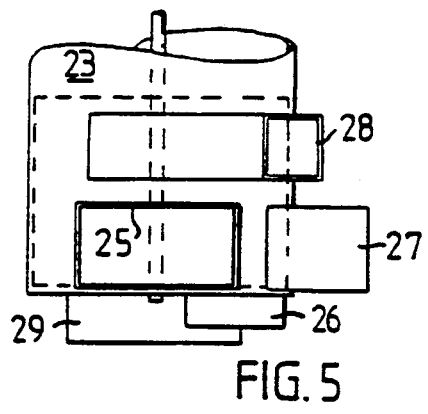
FIG. 5 is a top plan view of the distributor device according to FIG. 3.

As has been mentioned above, the distributor device 4 is of symmetric configuration, for which reason only the left-hand half thereof as illustrated in FIG. 1 will be described in greater detail hereinbelow, for purposes of simplicity. It is apparent from FIGS. 3-5 that this left-hand half has outlets in both the circumferential surface 23 and end wall 24 of the housing 11. On the upper side of the circumferential surface 23, there is disposed a defroster outlet 25 proximal the end wall 24 for a defroster nozzle. Offset in the circumferential direction in relation to the defroster outlet 25 and most proximal the end wall 24, there is disposed a rear floor outlet 27 for the rear floor nozzle 7. Axially inside the defroster outlet 25 and the rear floor outlet 27, there is provided a centre outlet 28 for the centre nozzle 8 placed on the dashboard or fascia panel. As is shown in FIGS. 3-5, the outlets 25 and 27 are axially offset from the centre outlet 28. In the end wall 24, there is disposed a front floor outlet 26 for the front floor nozzle 6 and a side outlet 29 for the side nozzle 9. This side outlet 29 also communicates with the circumferential surface 23 and may thus be supplied with air both via the end wall 24 of the housing 11 and its circumferential surface 23. A rear ventilation outlet 30 for the rear ventilation nozzle 10 branches off from the side outlet 29.

Figure 6:
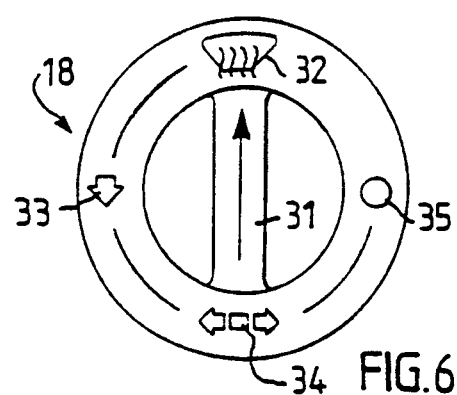
FIG. 6 shows an air regulator for modifying the ventilation.

According to FIG. 6, the air regulator device 18 is provided with a dial 31 for setting the ventilator unit 12 in different angular positions. From one position 32 straight up, in which air is directed exclusively at the windscreen via the defroster nozzles 5, the dial may be turned in a counterclockwise direction first to a position 33 at which air is directed exclusively towards the floor via the floor nozzles 6 and 7, and thereafter to a position 34 at which the air is blown out exclusively via the nozzles 8, 9 and 10. In addition, there is a shut-off position 35 at which no air is blown out at all. The dial 31 can also be set in any optional position between these indicated positions in order to obtain different intermediate settings.

The design of a ventilator element 16 is apparent from FIG. 7. An end wall portion 37 connects to one side of a circumferential portion 36, the end wall portion being provided with a mounting aperture 38 for the shaft 15. The aperture 13 in the ventilator element 16 is composed of two apertures 13a and 13b, of which the aperture 13a is rectangular and is located in the circumferential portion 36, while the aperture 13b is sectoral and is located in the end wall portion 37. The apertures 13a and 13b each take up an angle cz of the circumference of the ventilator element 16. Correspondingly, the aperture 14 (which is rectangular and forms a slot) takes up an angle $\beta$. As will be apparent from the Figures, the aperture 13a and the aperture 14 are mutually offset and spaced in the axial direction of the casing portion 36 in order to be able to cooperate with different outlets in the circumferential surface 23 of the housing 11. The aperture 14 can only cooperate with the centre outlet 28, while, on the other hand, the aperture 13 can cooperate with the defroster outlet 25, the floor outlets 26 and 27, and also the side outlet 29 and the rear ventilation outlet 30. The apertures 13 and 14 are mutually offset in the circumferential direction by an angle $\gamma$.

The closer cooperation between the apertures in the ventilator element 16 and the various outlets in the housing 11 at different settings of the air regulator device 18 is apparent from FIG. 8. In FIG. 8a, the dial 31 is set in the defroster position 32, the aperture 13a being located in register with the defroster outlet 25, so that the positive discharge of air may take place via this outlet. On the other hand, no air can flow out via the apertures 13b and 14, for which reason the remaining outlets are closed. When the dial 31 is rotated counterclockwise from the defroster position 32, the aperture 13a is placed in communication with the rear floor outlet 27, while the aperture 13b is placed in communication with the front floor outlet 26. The aperture 13a is still in communication with the defroster outlet 25. When the dial 31 has reached the floor position 33 illustrated in FIG. 8b, the defroster outlet 25 will have been fully closed and air is now only blown out via the floor outlets 26 and 27. No air can still be blown out via the aperture 14.

On counterclockwise rotation of the dial 31 from the floor position 33, the apertures 13a and 13b are also placed in communication with the side outlet 29 and the rear ventilation outlet 30,31, at the same time as the aperture 14 is placed in communication with the centre outlet 28. When the dial 31 has reached the ventilation position 34 illustrated in FIG. 8c, the floor outlets 26 and 27 will have been fully closed so that air is now only blown out via the centre outlet 28 and the side outlet 29, as well as the rear ventilation outlet 30.

Figure 8D:
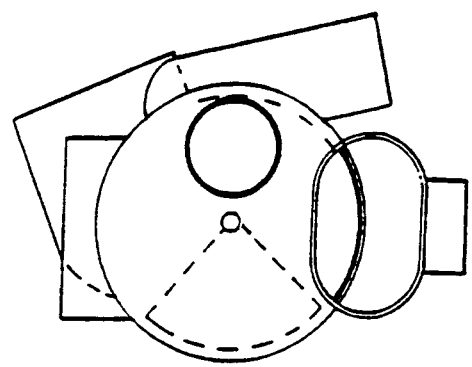
Figure 9D:
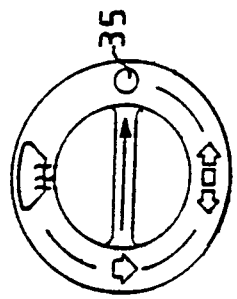
Figure 8C:
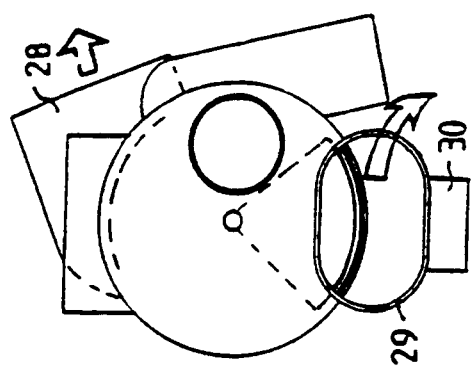
Figure 9C:
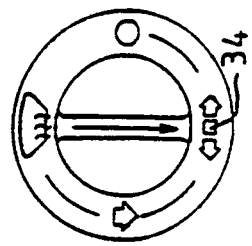
Figure 8B:
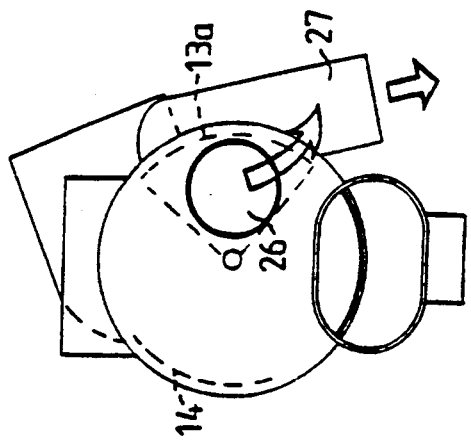
Figure 9B:
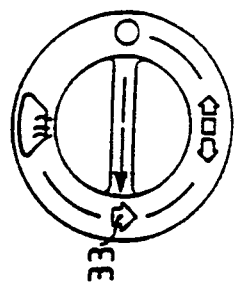
Figure 8A:
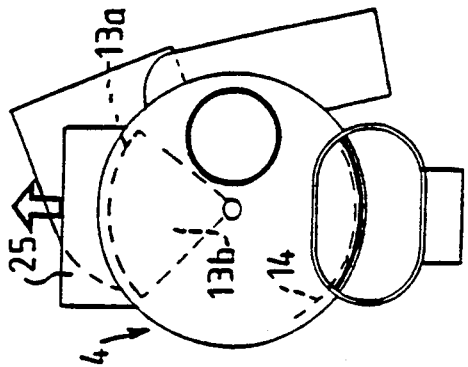
Figure 9A:
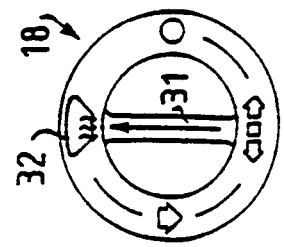

When the dial 31 is rotated counterclockwise from the ventilation position 34 illustrated in FIG. 8c, the outlets 28, 29 and 30 are gradually closed until being closed completely - like the remaining outlets - in the position illustrated in FIG. 8d, at which the dial 31 is located in the shut-off position. The fan is also suitably shut-off in this position. On rotation of the dial 31 in the opposite direction, a reverse sequence in relation to the above will be obtained.

By modifying the configuration and position of the apertures or outlets, or of both together, air discharge can be caused to take place in a manner different from that described above. One example of modified design of the apertures in the ventilator element 16 is illustrated in FIG. 9, in which the aperture 13a is wedge-shaped and in which there are apertures 38 in the end wall portion 37 in association with the aperture 13b. In addition, apertures 39 are provided in the circumferential portion 36 in association with the aperture 14. The apertures 38 and 39 give a certain leakage air flow and can, for example, vary in configuration and size in the circumferential direction in order to provide, in different positions of rotation of the ventilator unit 12, suitable leakage flow in connection with the apertures 13b and 14. Correspondingly, there may be provided, in association with the aperture 13a, a number of circumferentially distributed small apertures 40 in order to ensure that the defroster outlet 25 is always supplied with a certain air current in order to keep the windows and screen demisted. The size of the leakage flows may be adapted to suit different vehicle models by modifying the size of the small apertures 38–40. Hereby, account may be taken of the difference in size of pressure drop in different vehicles.

Since the air flow regulation is effected solely by one dial movement, silent and simple regulation is made possible, in which the regulation force required varies but insignificantly for different positions of rotation. The servo regulation of the rotation movement may be effected simply, for example electrically by means of a step motor, or vacuum controlled, pressure controlled using motors or step timers.

As has been mentioned in the foregoing, the positive discharge of air takes place, in the illustrated example, symmetrically in the vehicle, but it is also possible, by suitable design of the ventilator unit 12 and the housing 11, to ensure that air is discharged asymmetrically or in any other way. It is also possible, for instance, to render the two ventilator elements 16 separately operable and to divide up the housing 11 by one or more partitions, possibly in combination with the use of a plurality of ventilator elements, in order to provide for different ventilation to the right and left in the vehicle.

Since both the circumferential surface and end walls of the housing 11 can be provided with outlets in a number of different positions, there will realized a simple and space-saving installation even when a large number of outlets are employed. One advantage is, moreover, that the pressure drop for all outlets will be slight, since the flow path of the air is very simple and direct, from the point when the air is led into the housing 11 and until it leaves the housing via any of the outlets. Hereby, the noise level of the entire ventilation system can furthermore be reduced.

Adaptation to different vehicle models may, for instance, be effected in that one and the same housing 11 is provided with different ventilator units 12 according to automobile model, or in that different outlets in the housing are modified using inserts of different types so that the desired flow is obtained in different settings and adjustment positions.

By designing the distributor device with moderate clearance between the ventilator unit 12 and the housing 11, a certain outflow may be obtained in outlets which otherwise are closed. This may, for example, be desirable in order always to ensure a certain pressurization within the interior of the vehicle.

I claim:

1. A ventilation distributor device for a vehicle ventilation system for distributing ventilation to a plurality of ventilator nozzles in the vehicle, the distributor device comprising:
   a substantially cylindrical housing having a first circumferential housing surface and a first housing end wall; at least one first outlet in the first circumferential surface and at least one second outlet in the first end wall;
   a substantially cylindrical ventilator unit rotatably journaled in the housing to rotate with respect to the housing, the ventilator unit having a second circumferential ventilator unit surface and a second ventilator unit end wall;
   at least one first aperture in the second circumferential surface and placed so that rotation of the ventilator unit may bring one first aperture of the ventilator unit to coincide with one first outlet from the housing; at least one second aperture in the second end wall placed so that rotation of the ventilator unit in the housing may bring one second aperture to coincide with one second outlet from the housing;
   at least one ventilator unit first aperture and one ventilator unit second aperture being merged to define a single continuous aperture; at least a first one of the first housing outlets and at least a first one of the second housing outlets together communicating with both of the second circumferential surface and the second end wall for being supplied with air via the single continuous aperture.

2. The device of claim 1, wherein there are a first plurality of the first apertures at first axially spaced locations in the second circumferential surface of the ventilating unit;
   there are a second plurality of the first outlets in the first circumferential surface of the housing, the first outlets of the second plurality are circumferentially offset and are axially so placed in the first circumferential surface and so placed with respect to the first apertures that a respective one of the first apertures cooperates with a respective one of the second plurality of first housing outlets dependent upon the rotative position of the ventilator unit in the housing.

3. The device of claim 2, wherein the first apertures in the ventilation unit are of a different geometrical configuration than the first outlets in the housing and the second apertures in the ventilation unit are of a different geometrical configuration than the second outlets in the housing.

4. The device of claim 3, wherein the ventilator unit is steplessly rotatably adjustable to different rotation positions in the housing for adjusting the extent of overlap of the first and second apertures with the first and second housing outlets for regulating the size of the air flow to the respective outlets dependent upon the rotative position of the ventilator unit in the housing.

5. The device of claim 1, wherein there are a first plurality of the first outlets in the first circumferential surface of the housing and there is a respective first aperture in the second circumferential surface of the ventilator unit which is adapted to cooperate with a different respective one of the first plurality of the first housing outlets dependent upon the rotative position of the ventilator unit in the housing.

6. The device of claim 5, wherein the first plurality of first outlets are at a first axial location in the first circumferential surface.

7. The device of claim 5, wherein there are a second plurality of first apertures in the second circumferential surface of the ventilator unit at axially spaced locations therein selected so that a respective first aperture in the second circumferential surface of the ventilator unit cooperates with a respective first outlet in the first circumferential surface of the housing dependent upon the rotative position of the ventilator unit in the housing.

8. The device of claim 7, wherein at least one of the first outlets is mutually circumferentially offset from other ones thereof in the first cylindrical surface.

9. The device of claim 9, wherein at least one of the first apertures is circumferentially offset from other ones thereof in the second cylindrical surface.

10. The device of claim 7, wherein at least one of the first apertures is circumferentially offset from other ones thereof in the second cylindrical surface.

11. The device of claim 1, wherein there are a plurality of the first outlets in the first circumferential housing surface, and a plurality of the first apertures in the second circumferential ventilator unit surface at axially spaced locations selected so that a respective one of the first apertures in the second circumferential surface of the ventilator unit cooperates with a respective one of the first outlets in the first circumferential surface of the housing dependent upon the rotative position of the ventilator unit in the housing.

12. The device of claim 1, wherein the ventilator unit has opposite respective end walls, each provided with respective second apertures.

13. The device of claim 12, wherein the ventilator unit includes two ventilator elements, each ventilator element having a respective circumferential surface and a respective one of the opposite end walls.

14. The device of claim 13, wherein the ventilator elements are connected together to rotate together.

15. The device of claim 3, wherein the first apertures in the second circumferential surface of the ventilator unit are rectangular in shape.

16. The device of claim 3, wherein the first and second apertures in the ventilator unit are rectangular shape apertures.

17. The device of claim 1, wherein the at least one first aperture in the ventilation unit is of a different geometrical configuration than the at least one first outlet in the housing and
   the second apertures in the ventilation unit are of a different geometrical configuration than the second outlets in the housing.

18. The device of claim 1, wherein the ventilator unit is steplessly rotatably adjustable to different rotation positions in the housing for bringing a first aperture and a first outlet or a second aperture and a second outlet into position for selectively controlling the size of the airflow to the respective outlet dependent upon the rotative position of the ventilator unit in the housing.

19. The device of claim 1, wherein the at least one of the first outlets and the at least one of the second outlets being merged together to define a single continuous outlet positioned to sometimes communicate with the single continuous aperture for receiving air therefrom.

* * * * *